June 11, 1957 H. W. FOSTER ET AL 2,795,175
CAMERA MECHANISM
Filed March 30, 1953 4 Sheets-Sheet 1
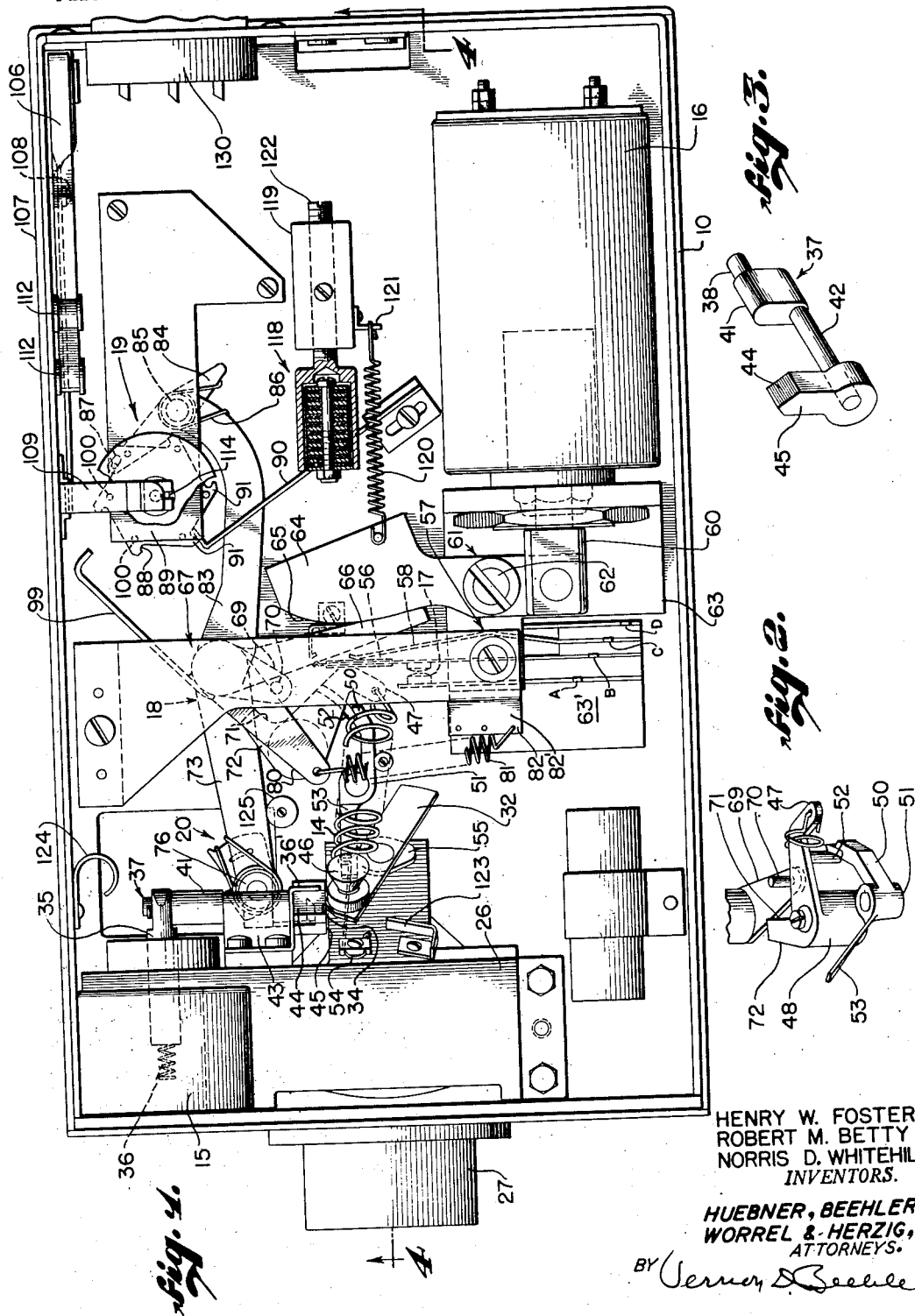
HENRY W. FOSTER
ROBERT M. BETTY &
NORRIS D. WHITEHILL,
INVENTORS.
HUEBNER, BEEHLER,
WORREL & HERZIG,
ATTORNEYS.

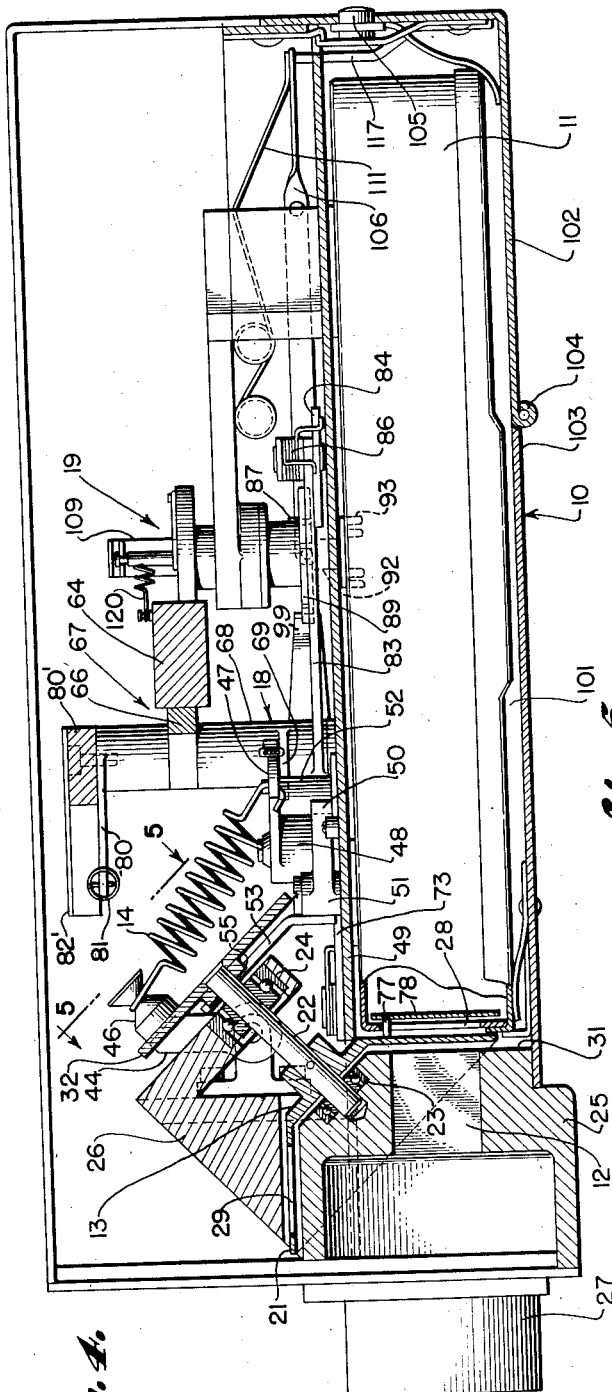

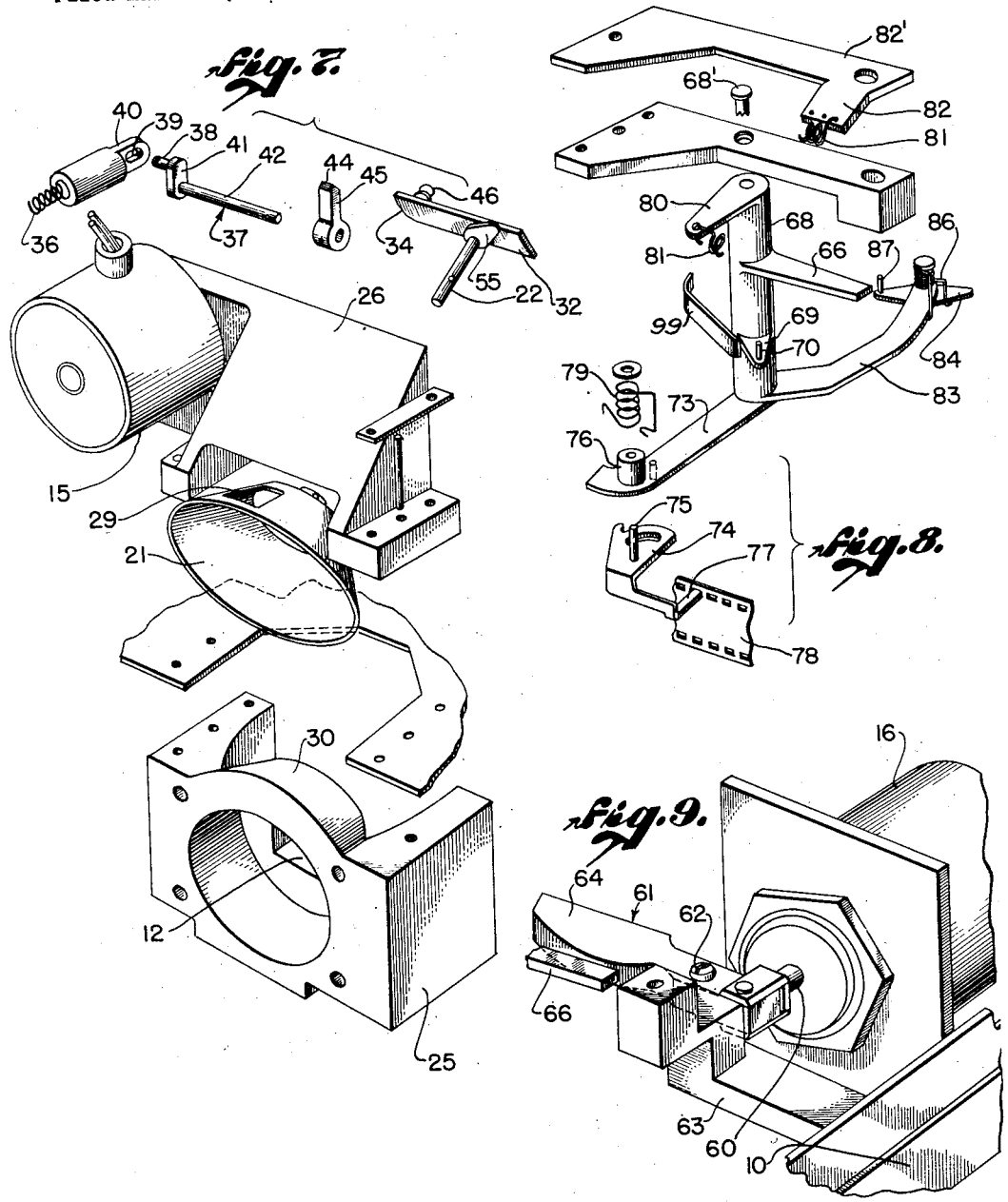

June 11, 1957 H. W. FOSTER ET AL 2,795,175
CAMERA MECHANISM
Filed March 30, 1953 4 Sheets-Sheet 4
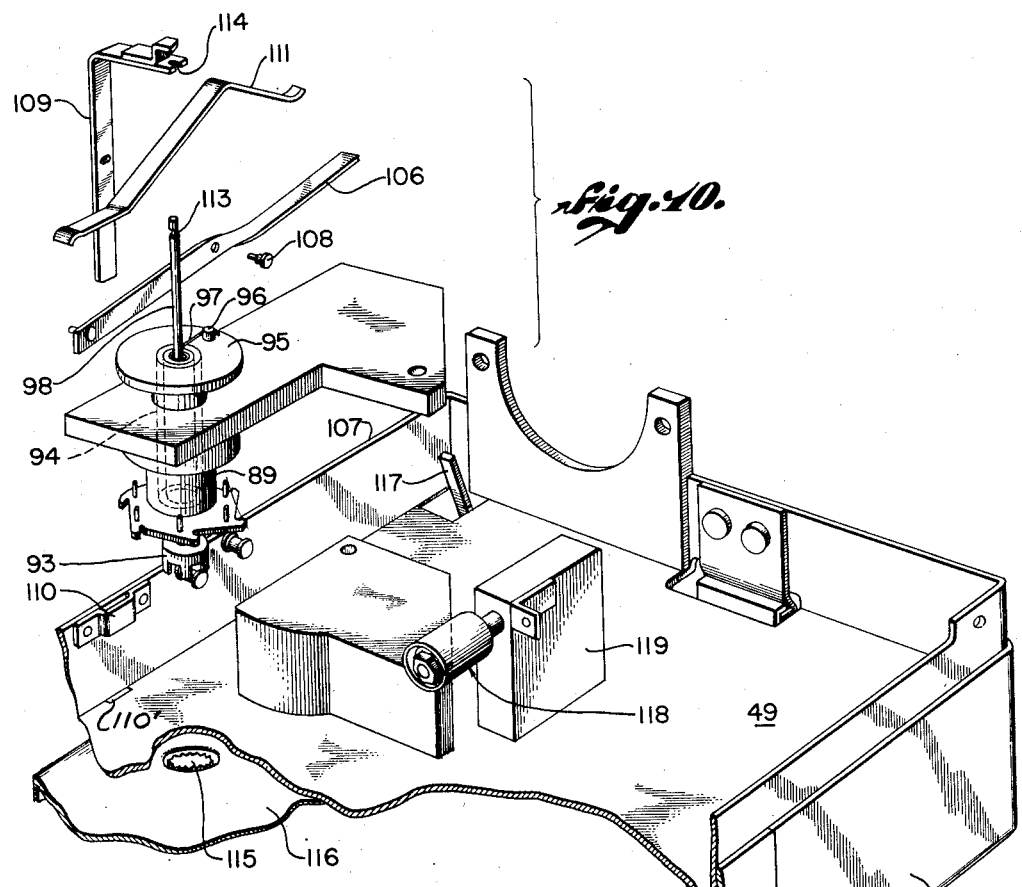
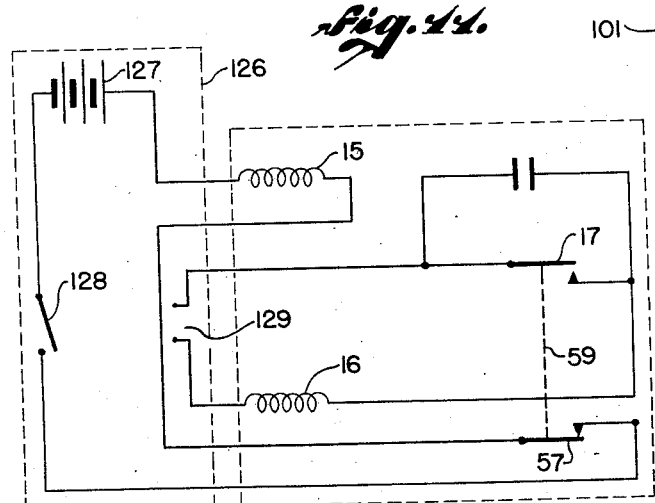
HENRY W. FOSTER,
ROBERT M. BETTY &
NORRIS D. WHITEHILL
INVENTORS.
HUEBNER, BEEHLER,
WORREL & HERZIG,
ATTORNEYS.
BY Vernon D. Beehler 2,795,175

United States Patent Office

Patented June 11, 1957

2,795,175
CAMERA MECHANISM

Henry W. Foster, Van Nuys, Robert M. Betty, North Hollywood, and Norris D. Whitehill, Malibu, Calif., assignors to Century Engineers, Inc., Burbank, Calif., a corporation of California Application March 30, 1953, Serial No. 345,368

10 Claims. (Cl. 95—58)

The invention relates to a data recorder or camera capable of making a succession of exposures on roll film. More particularly the data recorder or camera herein made the subject matter of this invention is one designed to be operated by electrical impulses at any desired rate from zero to in excess of fifty exposures per second, the device being further one particularly well adapted to the recording of experimental data by the employment of very rapid or very slow but extremely precise timing. The mechanism is one of especially rugged character sufficient to maintain accurate operation even though subjected to extreme conditions such for example as might be encountered in high altitude flight.

A great variety of camera mechanisms have been devised in order to make intermittent exposures upon roll film. Some of these mechanisms are in the nature of motion picture cameras which in fact take a series of still pictures upon roll film fed at measured rates past the lens aperture. A somewhat similar technique has been employed heretofore in impulse cameras designed and constructed especially to take accurately timed exposures for experimental studies at particularly short intervals of time between successive exposures.

Although camera mechanisms of this sort have been in successful operation in fields for which they have been especially built, for the most part the mechanisms are rather delicate and have been found unsatisfactory for use under many adverse conditions. Because extremely accurate and rapid operation has heretofore been the goal mechanical parts have been customarily made very light in weight so as to minimize friction in their operation and also to minimize the inertia of the parts to provide as little interference as possible with the accurate timing.

Practical difficulties have been experienced, however, in the employment of such mechanisms under conditions where there might be extreme variations in temperature, wide variations in pressure, and also where the accelerations imposed upon the parts might vary to a degree greatly interfering with the accuracy of operation. Such mechanisms when used under extreme conditions in the past have needed to be protected by casings and mounted with great care in order that the delicate mechanisms might continue to operate under such adverse conditions as have been suggested. The necessity for such protection has impaired use of the mechanisms to a very substantial degree.

It is therefore among the objects of the invention to provide a new and improved data recorder or camera mechanism which, while extremely accurate in its timing and rapid in its sequence, is at the same time constructed sufficiently rugged so that it will maintain its operation under widely diverse conditions without the necessity of providing special mountings and special casings for its protection.

Another object of the invention is to provide a new and improved camera mechanism which possesses a controlled speed and accuracy of operation to an extent not heretofore possible in camera mechanisms heretofore employed.

Another object of the invention is to provide a new and improved camera mechanism for operating the shutter of a camera which is extremely strong and positive in its operation not only at the critical time when the shutter aperture is opened but also throughout the entire range of shutter movement so that there will be an ample margin of accuracy to assure precise operation at all times.

Still another object of the invention is to provide a new and improved power actuated data recorder, the actuation of which can be initiated by an electric impulse timed in accordance with some conventional electric timing device, the mechanism, however, being so constructed that the shutter opening will be permitted only when all portions of the mechanism are properly pre-set.

Still another object of the invention is to provide a new and improved impulse or solenoid operated camera mechanism which employs a rotating shutter of special design permitting the shutter-actuating mechanism to be mounted at one side within a casing but in such a manner that the mechanism is readily accessible for reconditioning and servicing after the instrument has been operated for a long period of time, such reconditioning being one employed as a routine in order to be certain of the continuing accuracy of operation of the instrument.

Still further among the objects of the invention is to provide a new and improved impulse camera mechanism adapted to operate a rotating shutter at extremely rapid rates and at rapid timing, the mechanism being one interconnected with a film advancing and take-up linkage in such a manner that roll film customarily supplied to the instrument in a magazine will be advanced and taken up with an accuracy of timing sufficient to keep pace with the high degree of accuracy of the shutter mechanism.

Still further and more particularly among the objects of the invention is to provide an impulse camera employing a trigger solenoid and a reset solenoid with a mechanism of rugged character linking the reset mechanism with a rotating shutter device in such a fashion that a spring of considerable strength is used for rotating the shutter device to expose the film, the spring being manipulated by the reset mechanism so that it can be reset while tension is relieved and immediately thereafter set with the tension applied for a succeeding exposure which may be made ready after an extremely short interval.

With these and other objects in view, the invention consists in the construction, arrangement and combination of the various parts of the device whereby the objects contemplated are attained as hereinafter set forth, pointed out in the appended claims and illustrated in the accompanying drawings.

In the drawings:

Figure 1 is a side view of the camera mechanism with the adjacent side of the casing removed and with certain portions broken away so as to more accurately reveal the interconnection of the parts.

Figure 2 is a fragmentary perspective view of a trip device permitting the main or power spring to be released for resetting.

Figure 3 is a perspective view of the trigger-releasing mechanism by which the shutter is tripped.

Figure 4 is a longitudinal sectional view taken on the line 4—4 of Figure 1.

Figure 5 is a partial plan view of a portion of the shutter operating mechanism taken on the line 5—5 of Figure 4.

Figure 6 is a perspective view of the switch block through which the reset or power solenoid is actuated and the electric interlock set in operation.

Figure 7 is an exploded perspective view of the shutter device and trigger mechanism therefor.

Figure 8 is an exploded view of the mechanism or linkage for advancing the film.

Figure 9 is a partial perspective view of the end of the reset or power solenoid where the reciprocating core is connected to a reset linkage.

Figure 10 is an exploded partial view of a linkage mechanism which interconnects the camera mechanism with the roll film magazine.

Figure 11 is a wiring diagram of the electric system interconnecting a trigger solenoid with the reset or power solenoid.

The mechanism or device as a whole includes a case 10 in which a roll film magazine 11 is positioned immediately adjacent a lens aperture 12. The lens aperture is opened and closed by means of a rotating shutter device 13, the rotating impulse of which is supplied by a spring 14, as illustrated to good advantage in Figure 4.

The shutter is released by operation of a trigger solenoid 15 through a mechanism shown in some detail in Figure 5 and which is located in the upper left-hand corner of the case 10 as viewed in Figure 1.

After the shutter has been opened, a power or reset solenoid 16, illustrated in the lower right-hand side of the case in Figure 1, is set in operation by the closing of a reset switch 17, the closing becoming effective after the shutter has been rotated past an exposed position. When the reset solenoid is manipulated it operates through a linkage, the location of which is indicated by the reference character 18 at approximately the center of the case 10 as viewed in Figure 1.

The same linkage is interconnected with a film-advancing linkage, the location of which is indicated by the reference character 20 in Figure 1, and with a film rewinding linkage, the location of which is indicated by the reference character 19 in both Figures 1 and 4. Some details of the film-advancing linkage are illustrated in the exploded view, Figure 8. Portions also of the film rewinding linkage are shown in the exploded view, Figure 8, and in more detail in the exploded view, Figure 10.

In brief, when it is desired to expose one frame of the film a circuit is closed through the trigger solenoid 15, operation of which releases the rotating shutter device so that it is rotated by the spring 14. As soon as it has been rotated past a point where a shutter opening has exposed the film, the power or reset solenoid 16 is energized. This sets in operation the linkage which again sets the spring under full tension, the spring in the meantime having had its tension partly relieved subsequent to the exposure by a shift in the position of one end of the spring. The same linkage serves to advance the film in the magazine one frame and also serves to initiate a take-up mechanism in the magazine for taking up the portion of the film which has just been exposed. After being reset by the mechanism just described, the shutter device is immediately ready for a second exposure. For sequencing exposures, mechanical, electrical, or electronic switching devices of conventional design may be employed, the combination of the electric power supply 127 and the switch 128, Figure 10, schematically representing any such device, and herein identified as an electric pulsing unit.

In the form of the device as herein disclosed the shutter device is tilted at an angle of 45 degrees, as shown to good advantage at the left-hand end of Figure 4. The shutter device consists essentially of a frusto-conical skirt 21 keyed to a shaft 22 rotatably mounted in bearings 23 and 24, the bearings being supported respectively in bearing mounts 25 and 26. The bearing mount 25 may be considered also as encompassing and supporting a lens system 27, details of which are omitted as being of a conventional character. The lens system in any event is optically aligned with the lens aperture 12, this being in alignment with a suitable opening 28 in the magazine 11.

As illustrated in Figure 7, the skirt 21 has a somewhat trapezoidal shutter opening 29 at one side thereof, the shutter opening being trapezoidal so that all portions of the film will be exposed for the same length of time when the shutter device is opened.

The bearing mount 25 has a conical curved surface 30 adapted to conform to the curvature of the inside of the frusto-conical skirt of the shutter device. At a rear face 31 of the bearing mount there may be a similar curvature likewise for the accommodation of the skirt 21, the adjacent portion of which is always parallel to the face 31 and perpendicular to the axis of the lens opening 12 and appropriate lens system.

As illustrated in Figures 1 and 4, the shutter device is at initial or cocked position with the shutter closed. In that position the shutter opening will be about 150 degrees removed from the position the shutter opening will have when the lens aperture is opened. This will correspond substantially to the relative position of a shutter arm 32 in the position illustrated in Figure 5, wherein rotation of the shaft will be assumed as in a clockwise direction as there viewed.

With the spring 14 under tension, the shutter device will be restrained in cocked position, namely, the position of the parts shown in Figures 1, 4 and 5 by means of a detent mechanism 33, one element of which bears against a trigger portion of the shutter arm 32 which, in the embodiment illustrated, is an oblique flat face 34, seen to good advantage in Figure 5. Inasmuch as the spring 14 is biased to rotate the shutter arm 32 in a clockwise direction as there seen, interposition of the detent mechanism temporarily holds the shutter in cocked position ready for release to shutter open position when the detent mechanism is removed by operation of the trigger solenoid 15.

Specifically the trigger solenoid has a reciprocating core 35 normally urged to extended position by operation of a coiled spring 36. Reciprocation of the core 35 is transferred to rotary motion by means of the mounting of the detent mechanism, one detail of which is illustrated in Figure 3 and further details of which are illustrated in Figure 7. A stop 36' on the bearing mount 26 is adapted to bear against the finger 44 to limit action of the spring 36 in rotating the detent mechanism 33.

The detent mechanism consists essentially of a crank arm 37, shown in perspective view in assembled condition in Figure 3. The crank arm consists of several parts, namely, a drive pin 38 adapted to fit into an elongated slot 39 in a bracket 40 of the core 35. The drive pin 38 is connected by means of a block 41 to a shaft 42 which in turn is rotatably secured in a bushing 43 on the bearing mount 26. A detent finger 44 is keyed to the shaft 42 and so disposed that a side 45 of the bearing finger is adapted to face the oblique flat face 34 of the shutter arm 32. This relationship is readily observable in Figure 5. Clearly, therefore, from the description given, when the trigger solenoid 15 is energized, the core 35 is drawn inwardly to rotate the shaft 42 in a direction which would be counterclockwise as viewed in Figure 3 and also as viewed in Figure 4. Movement of the detent finger in that direction withdraws it from contact with the shutter arm, the shutter arm being then free for rotation subject to the pulling effect of the spring 14.

As shown to good advantage in Figures 1, 4 and 5, the spring 14 is retained on the shutter arm by means of a spring-keeper 46 having a spool-like shape over which the adjacent end of the spring can be readily looped. At its other end the spring 14 is attached to a spring retainer 47. The spring retainer is shown in some detail in Figure 2, the relative location of which with respect to the other portions of the mechanism is shown in Figures 1 and 4. The retainer may be described as consisting of a bushing 48 which is rotatably mounted upon the case at an interior wall 49 thereof. The retainer is a somewhat L-shaped arm attached to and extending outwardly from the bushing 48 and is rotatable through a small angular distance about the center of rotation of the bushing 48.

In cocked position of the parts or initial position of the parts such as the positions illustrated in Figures 1, 2 and 4, the spring retainer is maintained in that position by operation of a trip arm or tripper 50. The trip arm is shown clearly in Figure 2 as well as being shown with respect to its location and relationship to other parts in Figures 4 and 5. The trip arm 50 has a pivotally mounted bushing 51 which secures the arm rotatably upon the interior wall 49. In that position the trip arm bears against a plate 52 which extends downwardly, as viewed in Figure 2 and also in Figure 4, from the spring retainer 47. The trip arm thus temporarily holds the spring retainer in initial position which is a cocked position of the shutter.

An extension 53 forming part of the trip arm is directed angularly upwardly as viewed in Figure 4 to a position adjacent the shaft 22. The trip arm is normally retained in its initial retaining position by means of a light spring 54 fastened to an adjacent face of the bearing mount 26.

Secured to the shaft 22 is a cam element 55, this being located for convenience beneath the shutter arm 32. The cam element is so positioned and proportioned that when it is rotated in company with rotation of the shutter arm 32 and the shaft 22, the cam element 55 presses against the extension 53 moving it in a clockwise direction, as viewed in Figures 1 and 5. The movement need be only sufficient to disengage the trip arm from the plate 52. The location of the cam element 55 is made such that the trip is not disengaged until after the shutter opening has passed shutter opening position at which time the exposure has already been made. It is essential for the spring 14 to exercise its maximum possible effect upon the shutter arm and shutter so that the exposure may be positively timed to maximum efficiency. When the spring retainer has finally been released, the retainer will be permitted to rotate about the axis of the bushing 48 to the end that the end upon which the spring 14 is fastened is shifted throughout a distance bringing it nearer the center of rotation of the shaft 22 and also shifting it to a position over center with respect thereto.

As will be noted particularly in Figure 1, the spring retainer 47 in the position there illustrated bears against a switch arm 56 holding it in the position there illustrated. In that position the points of the reset switch 17 are held open. It should also be noted that a signal switch 57 has its points retained in closed position by reason of the fact that the switch arm 56 bears against a signal switch arm 58. The relative closed and opened positions of the switches 17 and 57 are also shown in the wiring diagram of Figure 11 when they occupy the adjustments just described. In the wiring diagram a mechanical connection between the switches is illustrated by the dotted line 59. This corresponds to the combination of the switch arm 56 and signal switch arm 57. The switches are shown on a switch block 63'.

When the trip arm 50 is shifted by operation of the cam element 55 releasing the spring retainer 47, the spring retainer is moved out of restraining contact with the switch arm 56 and by reason of a normal spring bias of the switch arm the switch arm moves so as to close the contact points of the reset switch 17. At the same time the spring bias in the signal switch arm 58 causes it to move to a new position, breaking contact between the switch points of the signal switch 57.

As promptly as the switch points of the reset switch 17 are closed, the reset or power solenoid 16 is energized. Energization of the reset solenoid sets in operation the linkage which resets the spring retainer 47.

More specifically, the reset solenoid is provided with a reciprocating core 60 which upon energization of the solenoid is drawn inwardly. At the same time a reset arm 61 is caused to rotate in a counterclockwise direction about a bolt 62 which rotatably mounts the arm upon the inner wall 49 to a bracket 63.

The reset arm 61 is provided with a weighted end 64 which, in addition to providing a counterbalance for the weight of the solenoid core, also provides a cam face 65; the cam face in turn bears against a finger 66 of an element indicated generally by the reference character 67 which may be designated a reset link. The reset link includes more particularly a bushing 68 by means of which the link is rotatably mounted upon the interior wall 49. Included in the reset link is a cam finger 69 at the end of which is a pin 70 located so that upon rotation of the reset link about the axis of the bushing 68, the pin will be brought to bear against a flat face 71 of a cam arm 72, the action of which tends to rotate the spring retainer 47 in a counterclockwise direction as viewed in Figures 1 and 2. The mechanism is so timed that at the moment the effect of motion of the core 60 of the reset solenoid is transmitted to the spring retainer 47, the springkeeper 46 on the shutter arm 32 will have passed almost to the initial or cocked position shown in Figure 1. When tension is finally again placed upon the spring 14 by rotation of the spring retainer 47 counterclockwise to its initial or cocked position, the shutter arm will then be drawn to initial or cocked position in which it will be retained by the detent finger 44.

Simultaneously the spring retainer will be moved against the switch arm 56 pushing it to the position shown in Figure 1 which will open the reset switch 17 and deenergize the reset or power solenoid 16.

The solenoid 16 hereinbefore chiefly referred to as a reset solenoid is also a power solenoid in the sense that it supplies the power for advancing the roll film and for operating the take-up mechanism in the roll film magazine. A film advancing arm 73 is also included as part of the reset link 67 and is adapted to rotate with it in a clockwise direction when the reset or power solenoid is energized. The film advancing arm 73 is connected to a film advancing finger 74 by means of a pin 75 rotatably contained in a bushing 76. A suitable connection permits the film advancing finger 74 a limited rotating motion at the outer end of the film advancing arm 73. The film advancing finger is provided with a film hook 77 adapted to engage the track at one edge of a roll film 78. The amplitude of motion given the reset arm at one operation is made sufficient to advance the roll film one frame. A suitable spring 79 of substantially conventional construction may be employed in order to resiliently retain the parts in initial position. To further retain the parts in a proper initial position, an anchor arm 80 may be employed to which is attached a spring 81, the other end of which is secured to an extension 82 on a plate 82'. A support 80' is also provided to accommodate a pin 68' which extends centrally into the bushing 68.

Another important function of the reset or power solenoid is to operate a rewinding mechanism in the magazine. Because of the very positive and powerful drive of the shutter mechanism under the impetus of the power solenoid, the connection to the rewind mechanism must be of a resilient character so as to cushion the impact upon the rewind mechanism. Rewinding, moreover is synchronized with the film-advancing mechanism and the shutter mechanism by having a rewind arm keyed to and operating simultaneously with the finger 66. It will be noted that the action of the reset link 67 under impetus of the reset or power solenoid is in a clockwise direction. This means that the rewind arm 83 is also rotated in a clockwise direction about the center of rotation of the reset link. Accordingly, at the outer end of the rewind arm 83 is a pivoted grab 84 adapted to rotate about a pivot connection 85 on the end of the rewind arm. A spring 86 is wound so as to bias its opposite ends respectively against the rewind arm and the grab so as to normally rotate a pin 87 to a position of potential engagement with recesses 88 of a sprocket wheel 89. A resilient sprocket detent 90 mounted upon the wall 49 normally engages teeth 91 of the sprocket wheel so as to prevent the sprocket wheel from rotating in reverse direction.

The sprocket wheel in turn is secured to and rotates with a shaft 92 at the lower end of which is a crown gear 93 adapted for engagement with a suitable connection of the film-advancing mechanism of the magazine 11.

More specifically, the sprocket wheel 89, as best shown in Figure 10, rotates a sleeve 94, the sleeve in turn through a suitable connection rotating a disc 95 upon which is a boss 96 to which is attached a spring 97, the spring in turn being secured to a portion 98 of the shaft 92 which is in turn connected through the shaft 92 to the crown gear 93. The spring drive afforded by the spring 97 produces in effect a slight delayed action in the roll film-advancing mechanism but more especially avoids a positive impact which would otherwise be created by the extremely forceful action of the power solenoid and the attached linkage. In this way, breaking the roll film is avoided as well as the placing of undue strain upon the mechanical portions of the roll film magazine.

To further improve the positive operation of the linkage which operates the film rewind mechanism there is provided a forward check finger 99 which is secured to the reset link 67 and which is adapted to rotate with the link 67 initially in a clockwise direction as viewed in Figure 1. As the rewind arm 83 moves clockwise drawing the sprocket 89 a distance sufficient to advance the rewind mechanism, the check finger 99 is simultaneously rotated to a position behind one of the pins 100. This is a positive assurance against forward rotation of the sprocket wheel 89 a distance greater than that required to advance the film one frame.

The magazine 11 already referred to is adapted to be contained in a magazine chamber 101 located as viewed in Figure 4 immediately below the shutter operating mechanism. To provide access to the magazine chamber a lid 102 is attached to a permanent wall 103 along a hinged line 104. To hold the lid in closed position a snap button 105 is employed which may be released by finger pressure.

When the lid is opened a lifting device will be in operation elevating the crown gear 93 to a position removed from the chamber 101, thereby leaving the chamber clear for insertion or removal of the magazine. Details of the magazine have been omitted inasmuch as the magazine is of substantially conventional construction designed to contain the usual reels for unexposed and exposed negative film arranged so that the film can be released from the unexposed reel, advanced past an opening 28 and thereafter taken up on a second reel.

For lifting the crown gear a lever 106 is employed pivotally secured to a wall 107 of the case by means of a bolt 108.

The left end of the lever 106, as viewed in Figures 1, 4 and 10 is adapted to be attached to an L-shaped bracket 109 so that the bracket can be moved up and down by movement of the lever. The lower leg of the bracket in turn is adapted to be slidably received in a U-shaped guide piece 110 also attached to the wall 107. A recess 110' through the intermediate wall 49 permits the bracket to slide down far enough to be operable. A leaf spring 111 is confined by means of studs 112 in a position such that the leaf spring bears at its right end against the right-hand end of the lever 106 tending to tilt it in a clockwise direction, as viewed in Figures 4 and 10. Tilting the lever in this direction tends normally to raise the left end of the lever and consequently to elevate the L-shaped bracket 109.

It will be noted further that the shaft 98 which carries the crown gear 93 is provided with an annular recess 113 at the top and that the recess is adapted to be received in an open slot 114 of the horizontal leg of the L-shaped bracket 109. It will be evident therefore that when the spring 111 is pressing on the lever 106 the bracket 109 will be lifted and this in turn will lift the shaft 98 and consequently elevate the crown gear 93 to a position removed from the magazine chamber 101.

After the magazine has been inserted an aperture 115 in a side wall 116 of the magazine will fall in the position shown in Figure 10. This position will be in axial alignment with the shaft 98 and crown gear 93. To lower the crown gear into operative position a trip arm 117 riveted to the lid 102 is elevated by closing the lid until the upper end of the trip arm, as viewed in Figure 4, presses upwardly against the right end of the lever 106 against the pressure of the spring 111, thereby forcing the lever to move in a counterclockwise direction about its point of rotation, the movement of which will lower the shaft 98 through the agency of the bracket 109 until the crown gear 93 enters the aperture 115 where it will be in a position of engagement for the mechanism contained in the magazine. Opening the lid 102 subsequently removes the trip arm 117 from its position of engagement and the spring 111 will then tilt the lever 106 in a contrary direction serving to lift the crown gear 93 from its position of engagement, thereby rendering the magazine free for removal.

Some refinements not materially affecting the overall principle of operation have been included in the mechanism. Among such refinements is the provision of a damper 118 to cushion the movement of the reset arm 61. The damper may comprise if preferred a series of alternating discs of metal and some isolating substance which will absorb the impact of the weighted end 64 of the reset lever 61 when it strikes against the damper. The damper is shown suitably mounted upon a block 119 which in turn is mounted upon the intermediate wall 49. It has been further found advantageous to employ a relatively light coiled spring 120 secured between the weighted end of the lever 61 and an appropriate bracket 121 on the block 119. A screw adjustment 122 may be provided if desired.

Other stops may also be provided as, for example, a back stop 123 for the shutter arm 32 which permits clockwise rotation of the shutter arm during normal operation but prevents operation in a counterclockwise direction as viewed in Figure 1. Moreover, a resilient stop 124 may be employed to limit clockwise rotation of the film-advancing arm 73, whereas a solid stop 125 can be used to limit rotation of the same advancing arm 73 in a contrary direction.

In initial position the reset arm 61 would rest against the damper 118 under tension of spring 120. Figures 1 and 4 for convenience in illustration show the position the parts would take when the power solenoid 16 is energized.

The electrical system is shown schematically in Figure 11 wherein a pulsing unit of substantially conventional construction is indicated by the reference character 126. A source of electric current 127 is suggested connected in series with a shutter or trigger switch 128. It will be noted that the circuit including the source of electricity and the shutter switch is completed through the trigger solenoid 15 and a normally closed signal switch 57. Connected in this way as soon as the shutter switch is closed, the trigger solenoid will be energized, thereby shifting the detent mechanism 33 by rotation of the crank arm 37 so as to release the shutter arm for operation.

A second circuit supplied by a source 129 of electricity of lower voltage if preferred is brought into operation when the reset switch 17 is closed by the agency of the spring retainer 47 already described. This has the effect of closing the reset switch 17, thereby energizing the reset or power solenoid 16 in order to initiate operation of the reset mechanism and the film-advancing and rewind mechanism through the linkages already described in detail. Suitable connections for the respective switches are indicated at the points A, B, C and D on the switch block 63' shown in Figure 6. The points A and B are for the reset solenoid and the points C and D are for the signal switch 57. A connecting plug or terminal 130 is shown in Figure 1 by means of which the electric circuit may be brought into the case. It will be appreciated, of course, that the shutter switch 128 may be located convenient to the pilot seat of an airplane or elsewhere independent of the camera location, or may in fact be an electronic switch actuated by radio transmitted pulses from a remote location, depending upon how the device is to be employed.

The function incidentally of the signal switch 57 is to prevent premature closing of the shutter switch 128 from energizing the trigger solenoid before the shutter has been cocked following the previous cycle.

There has accordingly been described herein a camera mechanism featuring particularly a shutter operating mechanism and reset mechanism therefore together with the necessary linkage for effecting a cooperative movement of a roll of film in a magazine. The mechanisms shown and described are particularly rugged in character as well as being simple in form and operation so as to produce a high precision camera instrument capable of taking a rapid succession of photographs at an arbitrarily random or uniform frame rate under extremely adverse and unusual conditions. By mounting all of the moving parts in a compact durable case the composite arrangement of mechanisms is at the same time a self-contained unit which may be placed at strategic and advantageous locations for study work and data recording while the operator may be positioned at some more remote location particularly advantageous or necessary to the operator. Safety features prevent operation of the shutter until all parts are in a position for positive operation. Moreover, the amplitude of movement of the working parts has been substantially minimized in the interest of providing extremely accurate timing as well as continued efficient performance.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention herein, what we claim as new and desire to secure by Letters Patent is:

1. In a camera the combination of a case, a shutter device, a shaft supporting said shutter device and rotatably mounted in the case, said shutter device being rotatable throughout one complete revolution for each exposure of film, a spring drive for rotating the shutter comprising a radially extending shutter arm on the shutter device, a rotating spring retainer pivotally mounted on the case on an axis spaced from the axis of rotation of the shutter, said shutter having a cocked position of rotation and position of minimum tension and a power spring extending from the shutter arm to the retainer, a trigger release mechanism comprising a trigger on the shutter device and a reciprocating detent on the case having a cocked position in engagement with the trigger and a released position removed therefrom, a spring tension releaser comprising a trip arm pivoted on the casing having one end in temporary engagement with the spring retainer, and a portion of the shutter device being engageable with another end of the trip arm at a position of rotation of the shutter device subsequent to passage of the shutter past an exposure position wherein the spring is shifted to a position of minimum tension, power means adapted to reset the spring in cocked position, and an operative linkage from the power means to the spring retainer operable in a direction contrary to the direction of shift to the position of minimum tension.

2. In an electrically powered camera the combination of a case, a shutter device, a shaft supporting the shutter device and rotatably mounted in the case, said shutter device being rotatable throughout one complete revolution for one exposure of film, a spring drive for rotating the shutter comprising a radially extending shutter arm on the shutter device, a rotating spring retainer mounted on the case on an axis spaced from the axis of rotation of the shutter, said shutter having a cocked position of rotation and position of minimum tension, and a power spring extending from the shutter arm to the retainer, a trigger release mechanism comprising a trigger on the shutter device and a reciprocating detent on the case having a cocked position in engagement with the trigger and a released position removed therefrom, a spring tension releaser comprising a trip arm pivoted on the casing having one end in temporary engagement with the spring retainer, and a portion of the shutter device being engageable with another end of the trip arm at a position of rotation of the shutter device subsequent to passage of the shutter past an exposure position wherein the spring is shifted to a position of minimum tension, power means adapted to reset the spring in cocked position comprising a power solenoid and a linkage from the power solenoid to the spring retainer operable in a direction contrary to the direction of shift to the position of minimum tension.

3. In an electrically powered camera the combination of a case, a shutter device, a shaft supporting the shutter device and rotatably mounted in the case, said shutter device being rotatable throughout one complete revolution for one exposure of film, a spring drive for rotating the shutter comprising a radially extending shutter arm on the shutter device, a rotating spring retainer transversely mounted on the case on an axis spaced from the axis of rotation of said shaft and having a cocked position of rotation and position of minimum tension, and a power spring extending from the shutter arm to the retainer, a trigger release mechanism comprising a trigger on the shutter device and a reciprocating detent on the case having a cocked position in engagement with the trigger and a released position removed therefrom, a spring tension releaser comprising a trip arm pivoted on the casing having one end in temporary engagement with the spring retainer, and a portion of the shutter device engageable with another end of the trip arm at a position of rotation of the shutter device subsequent to passage of the shutter past a film exposing position wherein the spring is shifted to a position of minimum tension, and power means adapted to reset the spring in cocked position comprising a power solenoid, a rotatable reset arm responsive to solenoid actuation including cam means in rotatable engagement with the spring retainer in a direction opposite the direction of the initially recited movement, said spring retainer having a switch-closing mechanism responsive thereto during movement of the retainer to position of minimum tension thereby to initiate resetting operation of the power solenoid.

4. In an electrically actuated camera for a roll film take-up mechanism the combination of a case, a shutter device rotatably mounted in the case for movement in the same rotational direction throughout successive exposure cycles, a spring drive for rotating the shutter device comprising an eccentrically located element on the shutter device, said shutter device having a cocked position, a shutter opening position and a reset stroke, a spring extending from said element and a power reset linkage having a full tension adjustment at cocked position and a less than full tension adjustment at reset position corresponding respectively to cocked position and to the reset stroke of the shutter device, and a shutter release for said shutter device comprising a solenoid and a reciprocating core therein, a pivoted crank arm linked at one end to said core, said crank arm having a portion thereof in engagement with the eccentrically located element at cocked position and adapted to be moved therefrom by operation of the solenoid.

5. In an electrically actuated camera for a roll film take-up mechanism the combination of a case, a shutter device including a shaft therefor rotatably mounted for movement in the same rotational direction throughout successive exposure cycles and said shaft extending obliquely into the case, a bearing mount in the case and a bearing therein rotatably supporting the shaft, a spring drive for rotating the shutter device, said shutter device having a cocked position, a shutter opening position and a reset stroke and comprising a radially extending arm on the shaft, a spring extending from said arm and an electrically reset linkage for driving said shutter device having successive adjustments at cocked and reset positions corresponding respectively to the cocked position and the reset stroke of the shutter device, and a shutter release for said shutter device comprising a solenoid and a reciprocating core therein, a crank arm rotatably mounted on the case having a radially extending portion linked at one end to said core, a release cam extending radially outwardly from said crank arm having a shutter retaining position in engagement with the shutter arm at a cocked position of the shutter device and adapted to be removed therefrom by operation of the solenoid.

6. A camera mechanism comprising a case having a lens aperture, a shutter element having a frusto-conical skirt and a trapezoidal opening therein, said shutter being adapted for rotation in the same direction through open and closed positions relative to said lens opening, said shutter element being mounted obliquely in the case in position wherein one side of the skirt lies substantially parallel to the lens opening, a shaft for said shutter element rotatably mounted in a tilted position in the case, and a spring-actuated drive for said shutter comprising a shutter arm on the shaft having an initial position with the shutter element closed, a second progressive position with the shutter element open and a third progressive position with the shutter element closed, a spring retainer on the case having a spring connected at one point thereon, said retainer having a cocked position corresponding to the initial and second positions of the shutter element and with said one point on one side of the axis of rotation of the shutter element and having a released position corresponding to the third position of the shutter element with said one point on the other side of said axis of rotation, a trip arm on the case having an end in releasable engagement with the retainer in cocked position and having another end adjacent the shaft, a trigger on the shutter arm and a reciprocating trigger release on the casing adapted to restrain the shutter element in initial closed position, a cam attached to the shaft adapted to engage said other end of the trip arm when the shutter element is rotating through said third position thereby to release the spring retainer, and a power-actuated spring reset means responsive to movement of the retainer when said retainer is in released position.

7. A camera mechanism comprising a case having a lens aperture, a shutter element having a circumferential continuous skirt and an opening in the skirt adapted for rotation in one direction through open and closed positions relative to said lens opening, a shaft for said shutter element rotatably mounted in the case, and a spring-actuated drive for said shutter element comprising a shutter arm on the shaft having an initial fixed position with the shutter element closed, a second progressive position with the shutter element open and a third progressive position with the shutter element closed, a spring retainer on the case having a cocked position corresponding to the initial and second positions of the shutter element and having a released position corresponding to the third position of the shutter element, a trip arm on the case having an end in releasable engagement with the retainer in cocked position and having another end adjacent the shutter element, a trigger on the shutter arm and a reciprocating trigger on the casing adapted to restrain the shutter in closed position, cam means on the shutter element having an engagement with the trip arm when the shutter element is rotating between said second and third positions thereby to release the spring and being disengaged from the trip arm at the other positions whereby the trip arm is retained in cocked position, and a power-actuated spring reset means responsive to movement of the retainer when said retainer is in released position.

8. An electric actuated camera mechanism comprising a case, a shutter element rotatably mounted in the case for unidirectional rotation from initial position through a lens open position to said initial position, a trigger solenoid and a solenoid actuated trigger release on the case in restraining engagement with the shutter element when the shutter element is in said initial position, a spring retainer reciprocably mounted on the case and a shutter-moving spring under variable continuous tension mounted between the shutter element and the retainer, said retainer having a cocked position corresponding to the initial position of the shutter element and a second position removed therefrom wherein the end of the spring attached thereto is moved to an opposite side of the center of rotation of the shutter element, a trip on the case responsive to shutter rotation having releasable engagement with the retainer, and a reset solenoid on the case having a reciprocating core, a reset linkage from the core to the retainer and adapted to return said retainer to cocked position, an electric circuit connecting said solenoids having a trigger solenoid switch, a normally open reset switch, a normally closed signal switch and an armature common to said last two switches operatively associated with said retainer in position wherein when the retainer is in released position the respective open and closed position of the last two switches is momentarily reversed during a reset operation of the reset solenoid.

9. An electric actuated camera mechanism comprising a case, a shutter element having a rotating shaft mounted in the case for unidirectional movement from an initial position through a shutter opening position to said initial position, a shutter arm on the shaft having a shutter closed initial position, a shutter open second position and a progressive resetting third position terminating in said initial position, a trigger on the shutter element, a trigger solenoid and a solenoid actuated trigger release on the case in restraining engagement with the trigger when in said initial position, a spring retainer rotatably mounted on the case and a shutter-moving spring mounted between the shutter arm and an eccentric location on the retainer, said retainer having a cocked position corresponding to the first two positions of the arm and a second position rotatively removed therefrom wherein the end of the spring attached thereto is moved from one side to the opposite side of the center of rotation of the shutter element, a trip rotatably mounted on the case responsive to shutter rotation having releasable engagement with the retainer, and a reset solenoid on the case having a reciprocating core, a pivoted reset arm linked at one end to the core, a reset link pivotally mounted on the case having one end in rotatable camming engagement with the reset arm, another end of said link having a rotatable camming engagement with the retainer and adapted to return said retainer to cocked position, an electric circuit connecting said solenoids having a normally open trigger solenoid switch, a normally open reset switch, a normally closed signal switch and an armature common to said last two switches operatively associated with said retainer in position wherein after closing of the trigger solenoid switch when the retainer is in said second position the respective open and closed position of the last two switches is momentarily reversed during a reset operation of the reset solenoid.

10. An electric actuated camera mechanism comprising a case, a shutter element having a rotating shaft mounted in the case for unidirectional rotation from an initial position through a shutter open position to said initial position, a crank on the shaft having a shutter closed initial position, a shutter open second position and a progressive shutter returning third position, a trigger on the shutter, a trigger solenoid and a solenoid actuated trigger release on the case in engagement with the trigger in said initial position, a spring retainer rotatably mounted on the case and a shutter-moving spring under constant variable tension mounted between the shaft and an eccentric location on the retainer, said retainer having a cocked position corresponding to the first two positions of the crank and a second position rotatively removed therefrom wherein the end of the spring attached thereto is moved from a position of greater tension to a position of lesser tension, a trip on the case responsive to shutter rotation having a releasable engagement with the retainer, and a reset solenoid on the case having a reciprocating core, a pivoted reset arm linked at one end to the core, a reset link pivotally mounted on the case having one end in rotatable camming engagement with the reset arm, another end of said link having a rotatable camming engagement with the retainer and adapted to return said retainer to cocked position, and an electric circuit connecting said solenoids having a trigger solenoid switch and a reset switch.

References Cited in the file of this patent

UNITED STATES PATENTS

| | | |
|---|---|---|
| 1,963,095 | Petit et al. | June 19, 1934 |
| 2,233,390 | Kende et al. | Feb. 25, 1941 |
| 2,391,157 | Harvey | Dec. 18, 1945 |
| 2,474,323 | Rattray | June 28, 1949 |
| 2,517,658 | Gorey et al. | Aug. 8, 1950 |
| 2,537,905 | Mihalyi | Jan. 9, 1951 |

FOREIGN PATENTS

| | | |
|---|---|---|
| 1,008,550 | France | Feb. 27, 1952 |